United States Patent [19]
Kanazawa et al.

[11] 3,764,661
[45] Oct. 9, 1973

[54] PROCESS FOR PREPARATION OF CARBONYL SULFIDE

[75] Inventors: Telichi Kanazawa, Shimizu; Shigeru Ogawa, Tokyo; Sadayoshi Matsui, Shimizu; Masamichi Shimizu, Shizuoka-ken, all of Japan

[73] Assignees: Ihara Chemical Industry Co., Ltd.; Sagami Chemical Research Center, Tokyo, Japan; part interest to each

[22] Filed: Aug. 25, 1971

[21] Appl. No.: 174,911

[52] U.S. Cl. .............................. 423/416
[51] Int. Cl. ............................ C01b 31/26
[58] Field of Search ............... 23/203 R; 423/415, 423/416

[56] References Cited
UNITED STATES PATENTS
3,416,893   12/1968   Parish et al. ...................... 23/203 R

*Primary Examiner*—Earl C. Thomas
*Attorney*—William J. Daniel

[57] ABSTRACT

Carbonyl sulfide of high purity is obtained by reacting a mixture of carbon monoxide and sulfur at a moderate temperature using as a catalyst a water-free sulfide of certain metals.

12 Claims, 1 Drawing Figure

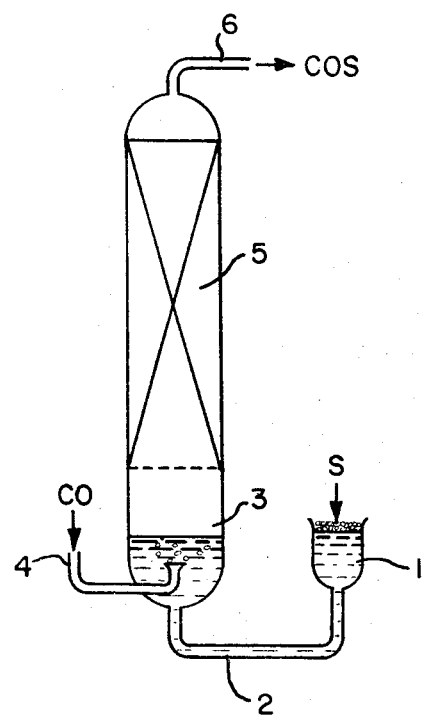

PROCESS FOR PREPARATION OF CARBONYL SULFIDE

This invention relates to an improved process for the preparation of carbonyl sulfide which is useful as a starting material for a variety of chemicals, especially thio organic compounds. More particularly, this invention relates to an efficient process for the preparation of carbonyl sulfide of high purity by reacting carbon monoxide with sulfur in the presence of at least one of a group of sulfides.

Several processes for obtaining carbonyl sulfide are known in the art. These include reacting carbon disulfide and carbon dioxide under heating in the presence of a catalyst, reacting carbon disulfide in a sealed tube with sulfur dioxide under heating, reacting hydrogen sulfide with carbon monoxide under heating, reacting a rhodanate with sulfuric acid, and reacting carbon monoxide with sulfur under heating. Of these processes, the last — wherein carbon monoxide is reacted with sulfur — is considered to be most advantageous for commercial scale production.

Within the general process of the latter type, specific procedures have been proposed wherein carbon monoxide is reacted with sulfur at a relatively high temperature of 350°–510° C. (German Pat. No. 1,222,024) and wherein carbon monoxide is reacted with sulfur in the presence of an aluminosilicate having a three dimensional structure at a more moderate temperature of 260°–483° C. (U. S. Pat. No. 2,983,580)

In actual practice, however, it has been found that the rate of reaction between carbon monoxide and sulfur is extremely slow within the temperature range of 350°–510° C. so that the preparation of carbonyl sulfide of high purity in this way within such temperature range necessitates prolonged periods of time. The obvious expedient of increasing the reaction temperature with a view to increasing the reaction rate will cause undesirable results such as thermal decomposition of the resulting carbonyl sulfide and corrosion of construction materials of the reaction apparatus.

On the one hand, if one follows the other known option and reacts carbon monoxide with sulfur in the presence of the aluminosilicate, the purity of the resulting carbonyl sulfide is found to be extremely low. Thus, this approach cannot be considered satisfactory for commercial scale production. This result can be chiefly explained on the basis that since the aluminosilicate catalyst contains water, the resulting carbonyl sulfide can react with the water to form hydrogen sulfide and carbon dioxide, thus causing deterioration of the resulting carbonyl sulfide. Consequently, this difficulty cannot be overcome, so long as the aluminosilicate is used.

An object of this invention is an improved process for the preparation of carbonyl sulfide in a good yield from carbon monoxide and sulfur.

Another object of this invention is to provide a new catalyst system capable of effectively promoting the reaction of carbon monoxide and sulfur to form carbonyl sulfide.

A further object of this invention is a process for reacting carbon monoxide with sulfur in two stages to obtain maximum purity of the carbonyl sulfide.

Still further objects and advantages of this invention will become apparent as the description proceeds.

As the result of extensive research on the preparation of carbonyl sulfide from carbon monoxide and sulfur aimed at overcoming the disadvantages in known processes and developing an industrially operable process for efficiently preparing carbonyl sulfide of high purity, it has been found in accordance with this invention that when carbon monoxide is reacted with sulfur in the presence of at least one sulfide of certain metals, the reaction proceeds smoothly at a relatively low reaction temperature to give carbonyl sulfide of high purity in a good yield.

In brief, the process of this invention comprises bringing a mixture of sulfur and carbon monoxide into contact with at least one substantially water-free sulfide of certain metals heated at 250°–450° C., whereby carbonyl sulfide is produced.

In the process of this invention, the molar ratio of carbon monoxide to sulfur is usually about 1:1 from the stoichiometrical point of view. Preferably, however, an excess of sulfur is used, a molar ration of 3–5:1 being optimum.

The catalyst used in the process of this invention is at least one metal sulfide selected from the group consisting of sodium sulfide, potassium sulfide, cobalt (II) sulfide, nickel sulfide, tungsten sulfide, chromium(II) sulfide and tin(II) sulfide. The quantity of catalyst should be sufficient to provide a liquid hourly space velocity of 1–50 volumes of carbon monoxide per hour per volume of catalyst. The catalyst may be in pelletized or granular form having a particle size of about 5–100 mesh.

A relatively low reaction temperature of 250°–450° C. is well suited to the process of this invention. No particular requirements are necessary for the reaction pressure, provided the pressure is sufficient to maintain the reactancts in effective contact. Either atmospheric or superatmospheric pressure is applicable. Usually, a period of time from several seconds to several minutes, preferably from 30 seconds to 2 minutes, is adequate as the reaction time in this invention.

A preferred embodiment of this invention comprises introducing carbon monoxide into molten sulfur heated at 300°–440° C under normal pressure to generate a gaseous mixture of sulfur (either as vapor or entrained fine particles) and carbon monoxide and then bringing the gaseous mixture into contact with the surface of a selected metal sulfide heated at 250°–450° C. to cause reaction.

Another preferred embodiment of this invention comprises introducing carbon monoxide continuously into molten sulfur containing a metal sulfide to generate a gas containing sulfur, carbon monoxide and carbonyl sulfide and then bringing the gas into contact with the heated metal sulfide to complete the reaction. In this modification, the metal sulfide to be added to the molten sulfur may be identical with or different from that to be contacted with the gas.

Still another embodiment of this invention comprises heating at 250°–450° C. a reaction tube in the form of a long metallic tube having a given metal sulfide deposited previously onto its inner wall, and then passing a gaseous mixture of carbon monoxide and sulfur through the heated tube.

Carbonyl sulfide thus obtained has a high purity of 92 percent or higher. If desired, it may be further purified according to a conventional manner.

The following advantages are attained by this invention. First, the reaction apparatus can be of minimal proportions because of the significant shortening of the residence time required for the reaction between carbon monoxide and sulfur. Second, side reactions are inhibited so as to promote the production of carbonyl sulfide of high purity by conducting the reaction at a low reaction temperature under mild conditions and by using the metal sulfide free from water. Third, corrosion of metals by carbonyl sulfide is reduced by handling carbonyl sulfide at a lower temperature, thus resulting in remarkable prolongation of the life of the reaction apparatus. As described above, the process of this invention is substantially superior to existing processes and is, indeed, suitable for industrial production.

One system for actually carrying out this invention will now be explained, referring to the attached drawing.

Dry, powdered sulfur in a reservoir 1 is heated, while passing through a heating tube 2, to liquid form and introduced into a glass-lined stainless steel mixer 3 where the liquid sulfur is mixed with carbon monoxide supplied continuously from an inlet 4 to form a gaseous mixture of sulfur and carbon monoxide. The gaseous mixture is then introduced into a reaction tube 5 packed with heated metal sulfide, where the reaction is initiated to form carbonyl sulfide. The resulting carbonyl sulfide is collected from an outlet 6 at the top of the reaction tube.

This invention will be explained more in detail by way of the following examples, which, however, are not intended to limit its scope.

Example 1

Using the apparatus shown in the drawing, carbon monoxide is blown at a rate of 15 cm³/min. (N.T.P.) into sulfur which has been molten by heating to about 380° C. The evolved gaseous mixture of carbon monoxide and sulfur is then brought into contact for about 30 seconds with a bed (2 × cm) packed with 250 gms of a 5–10 mesh metal sulfide at a density of 1.6 g./cc and heated to about 350° C. The resulting gaseous product is cooled, introduced into a gas sampler directly connected to a gas chromatographic analyzer, the gas composition thereby analyzed. The results of analyses of gaseous products obtained in this way using a variety of metal sulfides are shown in Table 1.

Table 1

| Exp. No. | Metal Sulfide | Composition of the resulting gas (vol.%) | | | |
|---|---|---|---|---|---|
| | | COS | CO | CO$_2$ | H$_2$S |
| 1 | K$_2$S | 92.5 | 6.1 | 0.6 | 0.8 |
| 2 | Na$_2$S | 92.1 | 7.1 | 0.3 | 0.5 |
| 3 | NiS | 93.0 | 6.4 | 0.3 | 0.3 |
| 4 | CrS | 93.8 | 5.1 | 0.8 | 0.3 |
| 5 | CoS | 90.9 | 8.2 | 0.5 | 0.4 |
| 6 | WS | 91.6 | 7.4 | 0.6 | 0.4 |
| 7 | SnS | 91.5 | 7.6 | 0.3 | 0.6 |
| Control | — | 12.6 | 87.4 | — | — |

Example 2

Using the apparatus shown in the drawing, carbon monoxide is blown at a rate of 15 cm³/min. (N.T.P.) into sulfur which has been admixed with 0.1% by weight of a powdery metal sulfide and melted by heating at about 380° C. The evolved gaseous mixture is brought into contact for 30 seconds with a metal sulfide in a manner similar to that described in Example 1 The resulting gas is cooled and then analyzed. The results are shown in Table 2.

TABLE 2

| Exp. No. | Metal sulfide added to sulfur | Metal sulfide contacted with gas | Composition of the resulting gas (vol. %) | | | |
|---|---|---|---|---|---|---|
| | | | COS | CO | CO$_2$ | H$_2$O |
| 1 | K$_2$S | CoS | 97.4 | 2.1 | 0.4 | 0.1 |
| 2 | Na$_2$S | WS$_2$ | 96.4 | 2.8 | 0.6 | 0.2 |
| 3 | Na$_2$S | SnS | 96.3 | 2.5 | 0.4 | 0.8 |

What is claimed is:

1. A process for the preparation of carbonyl sulfide comprising reacting in the gaseous phase carbon monoxide with sulfur in the presence of a substantially water-free catalyst at a temperature of 250°–450° C, said catalyst consisting essentially of at least one member of the group consisting of Na$_2$S, K$_2$S, NiS, CrS, CoS, WS and SnS.

2. A process according to claim 1 wherein in a first stage, carbon monoxide is continuously introduced into a mass of molten sulfur containing the catalyst and in a second stage the resulting gaseous reaction mixture is separated from said sulfur mass and brought into contact with additional heated catalyst to complete the reaction in the second stage, both said sulfur mass and said additional catalyst being heated to a temperature within said range.

3. A process according to claim 2 wherein different metal sulfides are used as catalysts in the two stages.

4. A process according to claim 2 wherein the sulfur is present in an amount in excess of stoichiometric proportions.

5. A process according to claim 4 whrein the molar ratio of sulfur to carbon monoxide is about 3–5:1.

6. A process as in claim 1 wherein a mixture of said carbon monoxide and sulfur in the gaseous phase is obtained by passing a stream of carbon monoxide thorugh a molten mass of sulfur maintained at a temperature of 250°–450° C and said gas phase mixture is contacted with said catalyst while the same is maintained at a temperature of 250°–450° C.

7. A process as in claim 6 wherein said gas phase mixture is separated from said molten mass before being contact with said catalyst.

8. A process as in claim 6 wherein said catalyst is in a form having high surface area.

9. A process as in claim 8 wherein said catalyst is in the form of a bed of finely divided particles.

10. A process as in claim 6 wherein the sulfur is present in an amount in excess of stoichiometric proportions.

11. A process as in claim 6 wherein the molar ratio of sulfur to carbon monoxide is about 3–5:1.

12. The process of claim 1 wherein said reaction is carried out under substantially atmospheric pressure.

* * * * *